United States Patent
Sethu et al.

(10) Patent No.: US 9,342,489 B2
(45) Date of Patent: May 17, 2016

(54) AUTOMATIC LINKING OF REQUIREMENTS USING NATURAL LANGUAGE PROCESSING

(71) Applicant: GM GLOBAL TECHNOLOGY OPERATIONS LLC, Detroit, MI (US)

(72) Inventors: Ramesh Sethu, Troy, MI (US); Prakash M. Peranandam, Bangalore (IN); Dnyanesh Rajpathak, Bangalore (IN); Soumen De, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 14/243,972

(22) Filed: Apr. 3, 2014

(65) Prior Publication Data

US 2015/0286631 A1 Oct. 8, 2015

(51) Int. Cl.
*G06F 17/22* (2006.01)
*G06F 17/27* (2006.01)

(52) U.S. Cl.
CPC .......... *G06F 17/2211* (2013.01); *G06F 17/277* (2013.01); *G06F 17/2775* (2013.01); *G06F 17/2785* (2013.01)

(58) Field of Classification Search
CPC ..................................................... G06F 17/28
USPC ............................................... 704/1–10, 257
See application file for complete search history.

(56) References Cited

U.S. PATENT DOCUMENTS

| | | | | |
|---|---|---|---|---|
| 8,799,776 | B2* | 8/2014 | Todhunter | G06F 17/30719 715/256 |
| 8,972,938 | B2* | 3/2015 | Bnayahu | G06F 8/10 455/404.2 |
| 2009/0094530 | A1* | 4/2009 | Champlain | G06Q 10/10 715/752 |
| 2012/0233112 | A1* | 9/2012 | Rajpathak | G06F 17/2785 706/54 |
| 2014/0163966 | A1* | 6/2014 | Dwarakanath | G06F 17/2765 704/9 |
| 2015/0066939 | A1* | 3/2015 | Misra | G06F 17/3071 707/739 |

* cited by examiner

*Primary Examiner* — Marcellus Augustin

(57) ABSTRACT

A method of automatic identifying linking relationships of requirements in a plurality of requirement documents. Terms in the plurality of requirement documents are identified. A part-of-speech tag is assigned to each term. Each identified term is selected as a focal term. Co-occurring terms within a predetermined distance of the selected focal term are determined. A linking relationship probability is calculated for each co-occurring term associated with the selected focal term. The selected focal terms and associated co-occurring terms between the plurality of requirement documents are compared. A degree of linking relationship is identified between two requirements as a function of a comparison between selected focal terms and the associated co-occurring terms between the plurality of requirement documents. An analysis report identifying the degree of linking relationships between two respective requirements is output.

23 Claims, 6 Drawing Sheets

| nGram | N-Grams Tagged with Part-of-Speech |
|---|---|
| Unigram | $(t_m^P, t_n^{Symp}, t_k^{FM})$ |
| Bigram | $(t_i^P t_j^P, t_i^P t_j^{Symp}, \ldots\ldots t_i^{Act} t_j^{Act})$ |
| Trigram | $(t_k^P t_j^{Symp} t_k^{Symp}, t_i^P t_j^P t_k^{Act}, \ldots\ldots t_i^P t_j^{Act} t_k^{Act})$ |
| Fourgram | $(t_i^P t_j^{Symp} t_k^P t_l^{FM})$ |
| Fivegram | $(t_i^P t_j^{Symp} t_k^P t_l^{FM} t_m^{ACT})$ |

35

↓

Estimate Probabilities 37    36

| nGram | N-Grams Tagged with Part-of-Speech | N-Grams Tagged with Part-of-Speech |
|---|---|---|
| Unigram | $(t_m^P, t_n^{Symp}, t_k^{FM})$ | $P(Unigram_i \backslash tag_j) = f(Unigram_i, tag_j)/tag_j$ |
| Bigram | $(t_i^P t_j^P, t_i^P t_j^{Symp}, \ldots\ldots t_i^{Act} t_j^{Act})$ | $P(Bigram_i \backslash tag_j) = f(Bigram_i, tag_j)/tag_j$ |
| Trigram | $(t_k^P t_j^{Symp} t_k^{Symp}, t_i^P t_j^P t_k^{Act}, \ldots\ldots t_i^P t_j^{Act} t_k^{Act})$ | $P(Trigram_i \backslash tag_j) = f(Trigram_i, tag_j)/tag_j$ |
| Fourgram | $(t_i^P t_j^{Symp} t_k^P t_l^{FM})$ | $P(Fourgram_i \backslash tag_j) = f(Fourgram_i, tag_j)/tag_j$ |
| Fivegram | $(t_i^P t_j^{Symp} t_k^P t_l^{FM} t_m^{ACT})$ | $P(Fivegram_i \backslash tag_j) = f(Fivegram_i, tag_j)/tag_j$ |

Fig. 5

AUTOMATIC LINKING OF REQUIREMENTS USING NATURAL LANGUAGE PROCESSING

BACKGROUND OF INVENTION

An embodiment relates generally to requirement document automatic linking using natural language processing.

In system development process, requirements provide necessary information about the functionalities that software must provide for the successful function of a system. Therefore, capturing requirements is used as a first step. The requirements are typically captured in free-flowing English language and the resulting requirement documents are spread over hundreds of pages. In many instances, multiple functional requirements may have some overlapping sub-functionalities and a same functional requirement gets captured at different places in a requirement document using inconsistent vocabulary. Typically, the SMEs (Subject Matter Expert) reviews the requirement document to identify the inconsistency and correctness issues and rectify them to improve the quality of the requirement document. Given the length of a requirement document as well as the inconsistent use of vocabulary coupled with abbreviations, the task of manually linking appropriate requirements in a mental model is a non-trivial, time consuming and error prone exercise.

Under a current process, the domain expert, such as a subject matter expert, relies on their personal experience and their own mental modelling capability to subjectively link the requirements. However, due to the challenges described above, the process is data intensive and challenging for an individual and leads to incomplete requirement analysis. This incomplete analysis is the source of the errors that may lead to further inaccuracies at a later development stage which in turn becomes more expensive to fix.

SUMMARY OF INVENTION

An advantage of an embodiment is the autonomous identification of hidden links among plurality of requirement documents in addition to the identification of the degree of the linking relationship between each of the requirements. The technique utilized natural language processing and semantic similarity techniques to fuse a probability relating to the relationships with context based models to analyze massive textual requirements to discover hidden associations among requirements. The technique allows for improved quality and knowledge management of improved requirements analysis, testing plan, and effective warranty based tracking.

An embodiment contemplates a method of identifying linking relationships of requirements in a plurality of requirement documents comprising the steps of: (a) identifying terms in the plurality of requirement documents; (b) assigning a part-of-speech tag to each term, the part-of-speech tag indicating whether the term is a part term, symptom term, action term or failure mode term; (c) selecting each identified term as a focal term and respectively determining co-occurring terms within a predetermined distance of the selected focal term; (d) calculating a linking relationship probability for each co-occurring term associated with the selected focal term; (e) repeating steps (a)-(d) for each selected focal term in the plurality of requirement documents; (f) comparing the selected focal terms and associated co-occurring terms between the plurality of requirement documents; (g) identifying a degree of linking relationship between two requirements as a function of a comparison between selected focal terms and the associated co-occurring terms between the plurality of requirement documents; and (h) outputting an analysis report identifying the degree of linking relationships between two respective requirements.

BRIEF DESCRIPTION OF DRAWINGS

FIG. 5 is a flowchart for an exemplary probability estimation for POS tagging.

DETAILED DESCRIPTION

Figure 1:
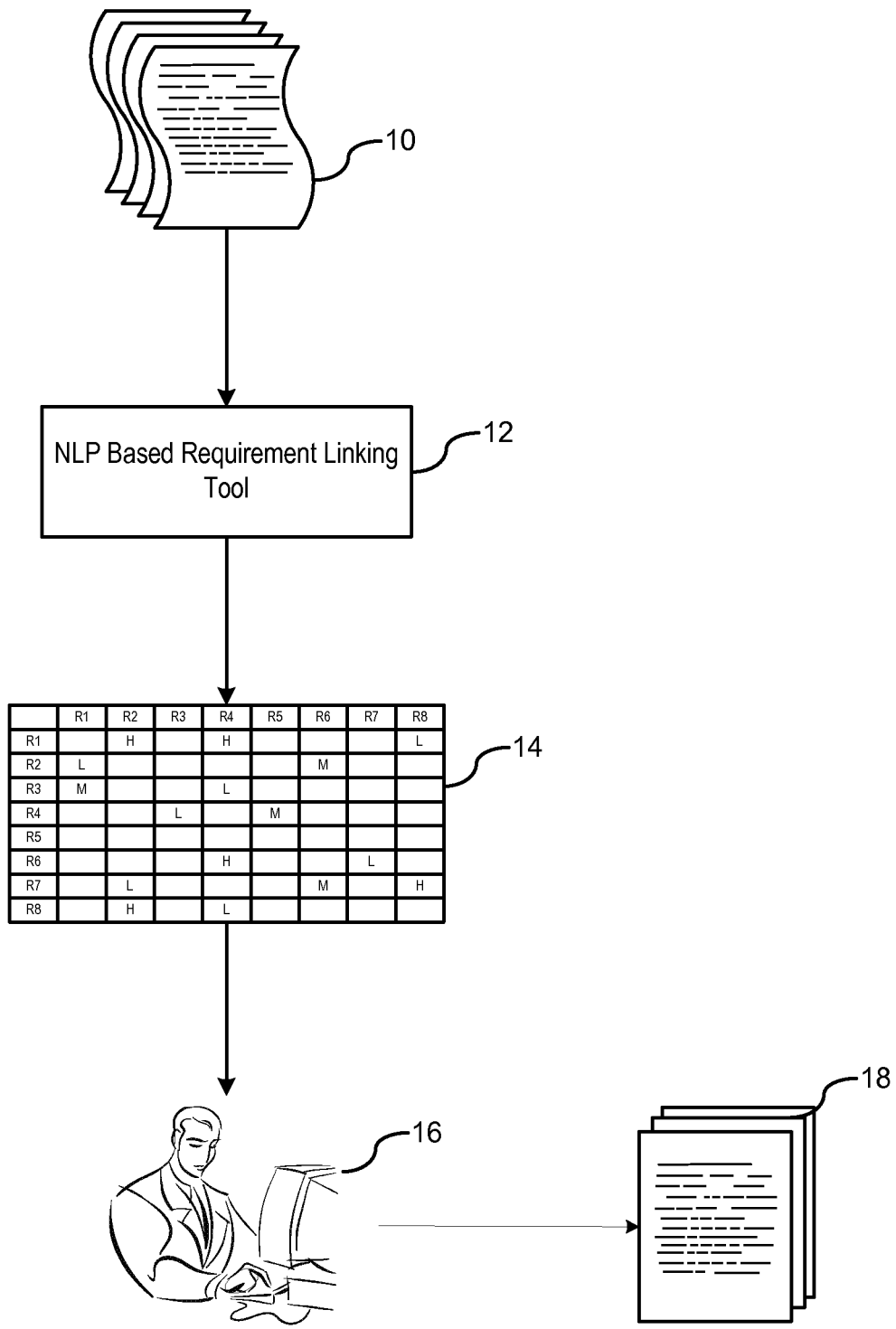
FIG. 1 is a block diagram of a general flow process for the requirement linking technique.

FIG. 1 illustrates a block diagram for analyzing implicit associations between requirements. A requirement is a description concerning a part or system or a software that provides details as to the functionality and operation requirements of the part or system or a software. In FIG. 1, requirement documents are shown generally at 10. Requirements are automatically correlated in a requirement matrix whereby requirements are linked by a natural linking processing-based requirement linking tool 12 for identifying a degree of linking relationships between one another. The relationships are illustrated in a requirement matrix 14. The requirement matrix 14 is provided to a peer review such as a domain expert 16. The domain expert 16 analyzes requirement matrix 14 and identifies inconsistency or correctness issues between the various documents/requirements and outputs those results in an analysis report 18, which effectively improves the quality of the requirements document.

Figure 2:
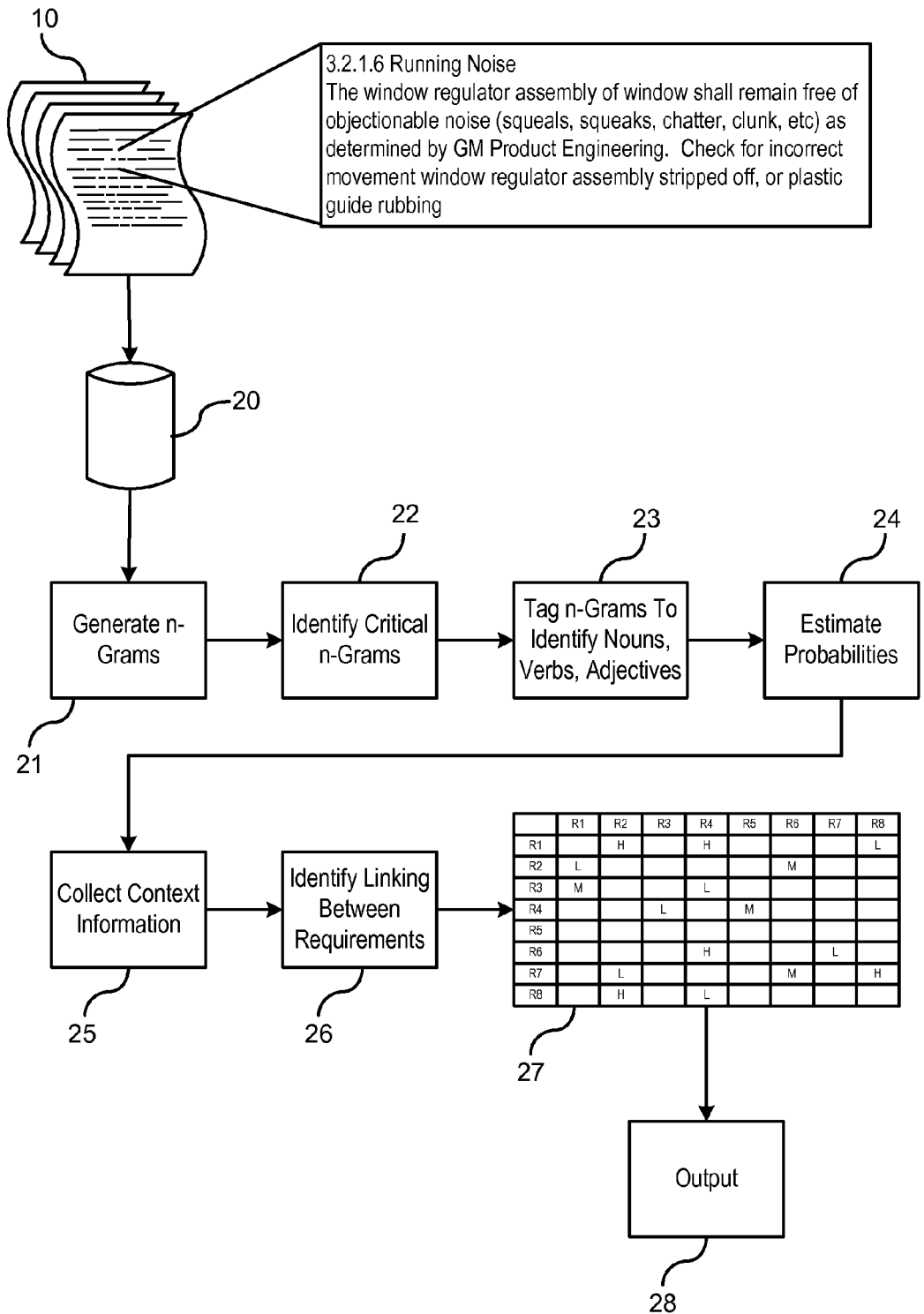
FIG. 2 is a block diagram of the overall methodology of the requirement linking technique.

FIG. 2 illustrates a flow diagram for the overall methodology of the requirement linking approach. The methodology includes a requirement documents 10 stored in a document database 20, a n-grams generation module 21, a critical n-grams identifier module 22, a tagging n-grams to identify part-of-speech (POS) tag module 23, an estimating probabilities module 24, a context information collection module 25, a linking relationship requirements module 26, a requirement matrix 27, and an output record generator module 28 that fills in the calculated link details from the linking requirements module 26 within the requirement matrix 27. It should be understood that each of the different modules herein may be a separate device, such a separate processor that cooperatively communicate via communication links with one another, or may one or more modules may be integrated in a respective processor having shared processing capabilities. Moreover, each of the modules may have a separate memory storage unit or may be memory storage unit that is shared.

Block 10 illustrates a plurality of requirements contained in the document database 20. An example of a requirement is shown that includes a description for running noise for a window regulator. The requirement identifies one or more components that have an associated description relating to, but not limited to, functionality, operation, and associated restrictions.

As shown in the exemplary requirement, the window regulator assembly should be free of certain affects such as objectionable noise. It is understood that the term "window regulator assembly" in addition to the term "objectionable noise" may be used in other requirements in the document. As a result, the requirement documents are analyzed for identifying linking relationships from other requirements/documents.

In block 21, terms are extracted by a natural language processing (NLP) technique for determining linking relationships to other requirements as set forth in the procedure herein. The extracted phase, hereinafter is referred to as an n-gram, is identified. The term "gram" refers to the term or terms of the phrase as a whole and "n" refers a number of terms associated with the phrase. For example, the term "window" would be identified as a uni-gram, whereas the term "window regulator assembly" would be identified as a tri-gram.

From each requirement document, the following types of n-grams are constructed: uni-grams that include phrases with a single word, (e.g. battery, transmission); bi-grams that include phrases with two words, (e.g. battery dead); tri-grams that include phrases with three words (e.g. body control module, instrument panel cluster, powertrain control module); four-grams that include phrases with four words (e.g. body control module inoperative, transmission control module assembly), and five-grams that includes phrases with five words (e.g. transmission control module assembly failed). The rationale of potentially utilizing possibly a n-gram that is five words long is due to a critical nature of a phrase in some instances containing five words. For example, critical terms that are the names of parts, symptoms, actions, and failure modes may be five words in length.

The n-grams are constructed and utilized because the technique described herein does not use any domain specific ontology (i.e., taxonomy) that would provide an origin or database of terms to identify critical terms from each requirement document. As a result, a natural language processing (NLP) approach is utilized whereby the n-grams constructed at this stage of the technique are subsequently tagged with their part-of-speech for identifying the correct classification of terms.

In block 22, critical n-grams are identified. It should be understood that not every single phrase that is in the requirement document is important for analysis. Therefore, non-critical terms must be filtered and only phrases that are relevant in the given context, such as those related to a specific Sub-System Management Team (SMT) while comparing two requirements should be maintained. For example, while comparing the requirements related to a body control module, phrases related only to the body control module are retained and all other phrases which are not directly contributing to the comparison are removed.

Figure 3:
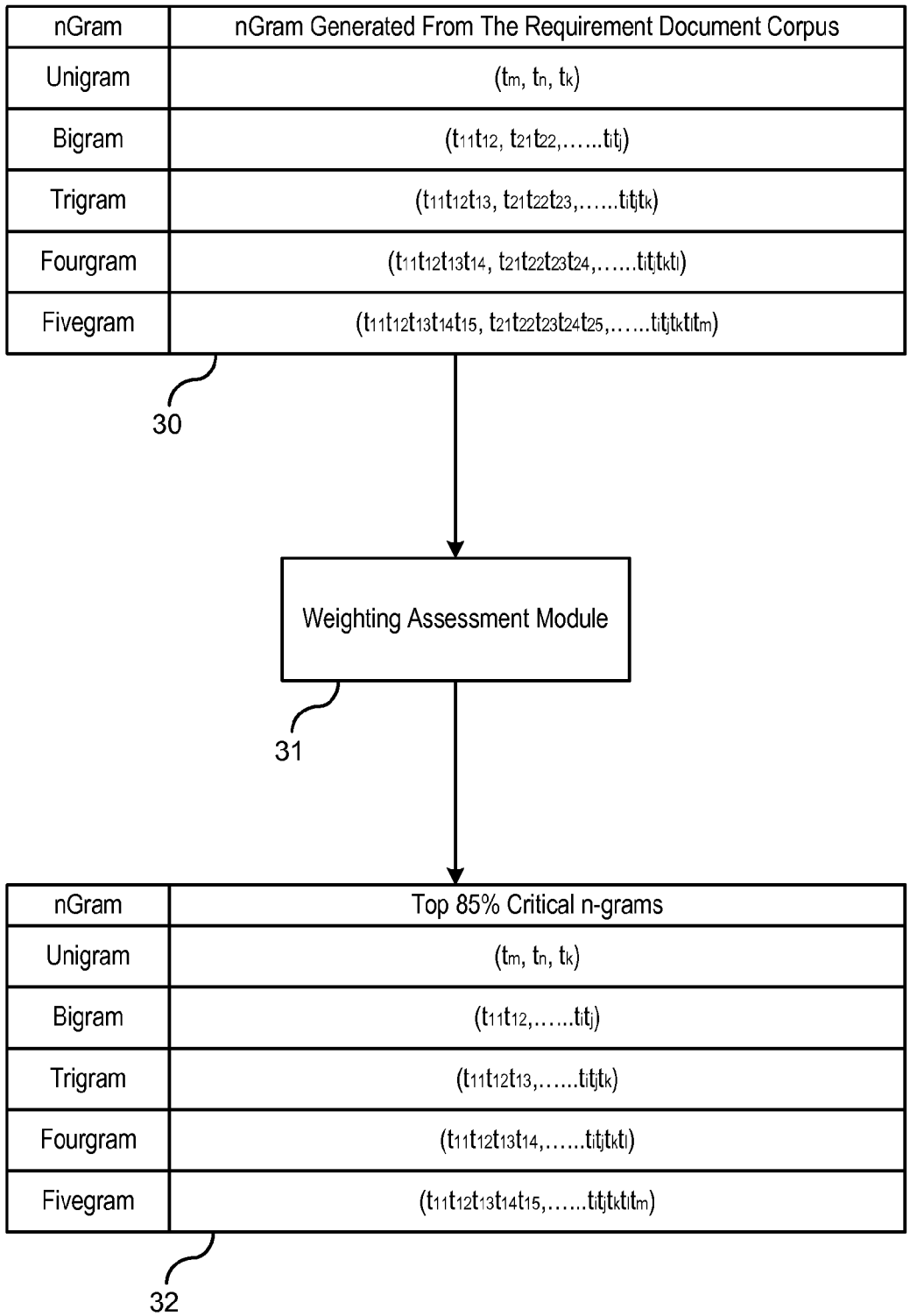
FIG. 3 is a flow diagram for identifying critical n-grams.

FIG. 3 illustrates a flow diagram for identifying critical n-grams from all of the n-grams identified in from the requirements document. Block 30 represents identified n-grams. The search is automatically conducted using NLP to identify all n-grams in the document.

In block 31, a weighting assignment module 31 is applied to the identified n-grams.

In block 32, critical n-grams are identified using a filtering process applied by the weighting assignment module. N-grams meeting a predetermined criticality threshold are identified. An exemplary predetermined threshold of 85% or higher may be used.

The criticality of the n-grams $(C_{n-gram})_{i,j}$ is calculated by using the following equations:

$$(C_{n-gram})_{i,j} = C_{i,j} * idf_{Ci} \quad (1)$$

$$C_{i,j} = \frac{n_{i,j}}{\sum_k n_{k,j}} \quad (2)$$

where $n_{i,j}$ is the number of occurrences of a given n-gram in a given requirement document, $C_i$ is the appearance of ith n-gram in a requirement document $C_j$, and the denominator is the sum of number of occurrence of all n-grams in $C_j$ in a given requirement document.

The weighting factor $idf_{Ci}$ is calculated using the following formula:

$$idf_{Ci} = \frac{\log|V|}{|\{v: C_i \in v\}|} \quad (3)$$

where $|V|$ is a total number of requirement documents in a corpus, and $\{v: C_i \in v\}$ is number of requirement documents only with the records of $C_i$.

Referring again to FIG. 2, block 23 represents enabling of POS tagging. Critical n-grams identified in step 22 are utilized as the input data. These critical n-grams are tagged with appropriate POS tags for identifying the critical parts, symptoms, actions, and failure modes, which are used in each requirement document. The critical n-grams are utilized as inputs and the POS algorithm outputs POS tags assigned to each n-gram. For example, the phrases such as "fuel pump", "evap vent valve", "engine light", reduced engine power", "will not start", "replace" are assigned the following POS tags: "fuel/NNP pump/NNP", evap/NNP vent/NNP valve/NNP", "engine/NN light/JJ", "reduced/VBN engine/NN power/NN", "will/MD not/RB start/NNP", "replace/VB".

Figure 4:
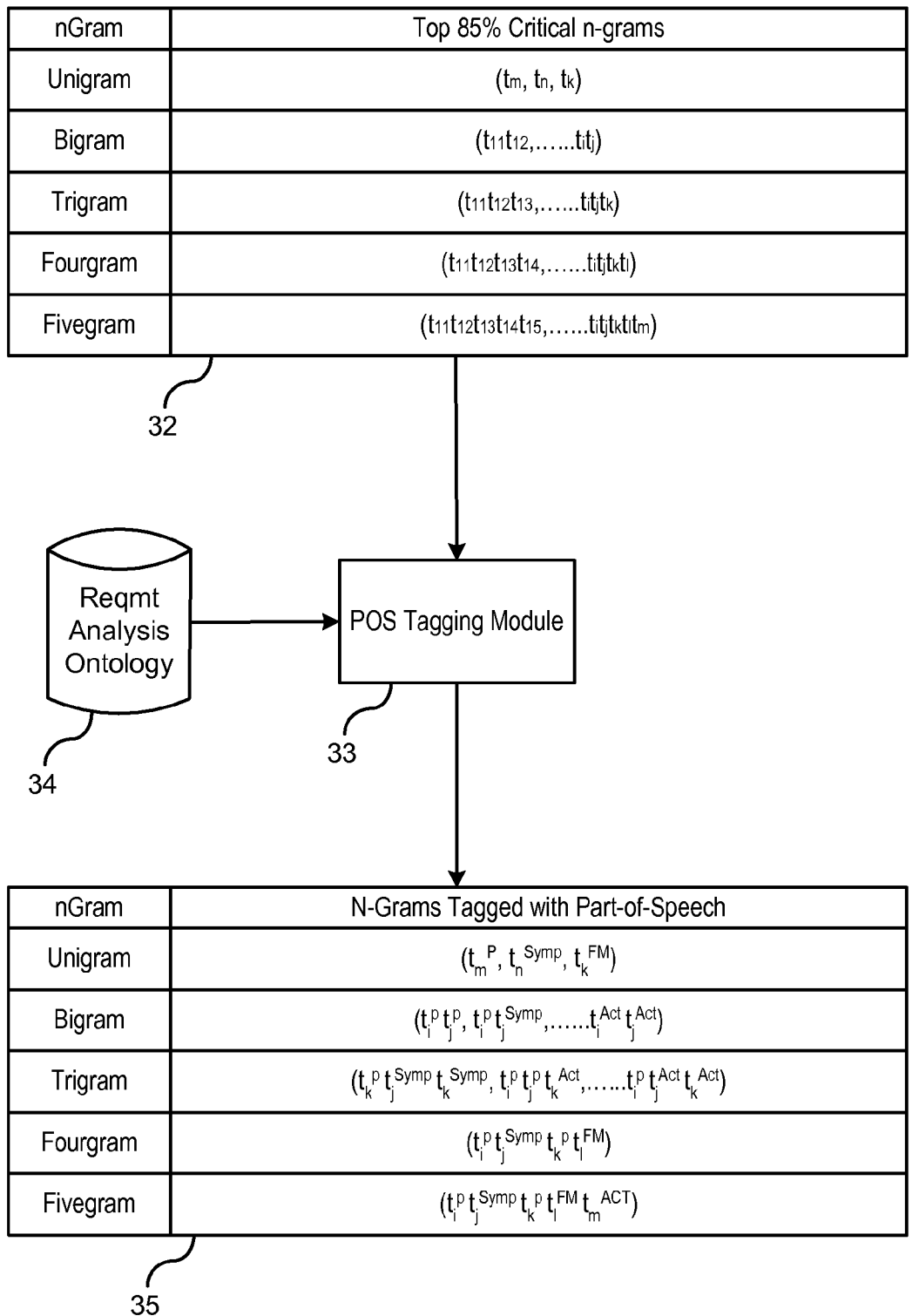
FIG. 4 is an exemplary POS tagging process utilizing the critical N-grams.

FIG. 4 illustrates an exemplary POS tagging utilizing the critical N-grams. The N-grams are set forth in the table identified in block 32.

A POS tagging module 33 is used to apply tags to the critical N-grams. Tags may be in the form including, but not limited to, CC (coordinating conjunction), CD (cardinal number), JJ (adjective), JJR (adjective comparative), NN (noun, singular or mass), NNS (noun plural), NNP (proper noun singular), NNPS (proper noun plural), RB (adverb), RBR (adverb comparative), RBS (adverb superlative), VB (verb, base form), VBD (verb past tense), VBG (verb, present participle), VBN (verb, past participle), VBP (verb, non-$3^{rd}$ person singular present), VBZ (verb, $3^{rd}$ person singular present). Optionally, a requirements analysis ontology 34 may be used to assist in the tagging a term of a phrase as a one of the part-of-speech tags.

Table 35 illustrates the critical terms with assigned POS tags. As shown, terms in the table are assigned an identifier that identifies its part of speech. It should be understood that the POS tags herein are exemplary and that different POS identifiers such as the exemplary tags described earlier may be used.

Referring again to FIG. 2, in block 24, in response to the assigning POS tags to the critical terms, a maximum likelihood of a specific n-gram having an assigned POS tag in the data is determined $[P(pos-tag_i|n-gram_i)]$. This assists in identifying whether the tag assigned to an n-gram is one of chance or whether it has a higher probability of having specific type of POS tag in a domain. A maximum likelihood estimation is performed by using the following steps:

In the first stage, while estimating a probability, Bayes law is used as shown in the following equation:

$$\arg_{post-tagi} = \max P(pos-tag_i | n-gram_i) \quad (4)$$

$$= \arg_{post-tagi} \max \frac{P(n-gram_i | pos-tag_i)P(pos-tag_i)}{P(n-gram_i)}$$

$$= \arg_{post-tagi} \max P(n-gram_i | pos-tag_i)P(pos-tag_i)$$

The denominator $P(n\text{-gram}_j)$ is going to be constant for each new instance of POS-tag$_i$; otherwise, it is not considered in the following stage.

In stage 2, in response to analyzing the higher-dimension n-grams (e.g., bi-gram to five-gram), a Bayes independence assumption is applied so that terms that are members of these n-grams are independent of one another. As shown below, the application of independence assumption on the exemplary bi-gram can be extended straightforwardly to other n-grams.

$$P(pos-tag_i) \approx P(pos-tag_i \mid pos-tag_{i-1}) \quad (5)$$

$$P(pos-tag_{i-1} \mid pos-tag_{i-2}) \ldots P(pos-tag_2 \mid pos-tag_1) = \prod_{m=1}^{i} P(pos-tag_m \mid pos-tag_{m-1}).$$

The term's identity depends on the tag assigned to it which yields the following equation:

$$P(n-gram_i \mid pos-tag_i) \approx \prod_{m=1}^{i} P(n-gram_m \mid pos-tag_m)\hat{p}os-tag_i = \quad (6)$$

$$P(n-gram_m \mid pos-tag_m)P(pos-tag_m \mid pos-tag_{m-1})$$

Finally, the probabilities given in Eq. (6) are calculated by using the maximum likelihood estimations as shown in the following equation:

$$P(pos-tag_m \mid pos-tag_{m-1}) = \frac{f(pos-tag_{m-1}, pos-tag_m)}{f(pos-tag_{m-1})} \quad (7)$$

$$P(n-gram_m \mid pos-tag_m) = \frac{f(n-gram_m, pos-tag_m)}{f(pos-tag_m)}$$

Using Eq. (7), the probability of specific POS-tag (i.e. pos-tag$_m$) having a specific n-gram$_m$ is estimated.

FIG. 5 illustrates an exemplary probability estimation for POS tagging. The N-grams are set forth in the table identified in block 35.

An estimation probabilities module 36 is used to determine the probability of a specific POS-tag having specific n-grams is estimated utilizing the process described above.

Table 37 illustrates an exemplary table identifying n-grams tagged with the POS and the associated probability as generally denoted.

Referring again to FIG. 2, in block 25, context information is collected. After assigning POS tags to critical n-grams in the previous two steps, contextual information is collected from each requirement document. The contextual information is critical as this information enables the comparison of terms in the correct context using semantic similarity. For example: it is assumed that the term "Switch" may be used in three different contexts: 1. Window Switch, 2. Light Switch and 3. Radio Switch. The term radio switch cannot be compared and linked with light switches or window switches. To properly compare and apply linking relationships, context information is required.

The contextual information collected for each POS tagged n-gram from any requirement documents is subsequently used to calculate the semantic similarity between them. For each requirement document, starting from the beginning of a respective document, a critical phase that is assigned with a POS tag is identified. Next, a start index and an end index of an identified focal term are identified. As shown below, a word window of three words is set on the either side of a focal term. The word window is a variable which shall be decided based on the nature of the document.

$$XXXXT_1XX[T_2xx^{StartIndex}\{Phrase_i\}^{Endindex}T_3XT_4]XXX$$

Context information on left=(Phase$_i$,$T_2$)

Context information on right=((Phrase$_i$,$T_3$),(Phrase$_i$,$T_4$))

The terms co-occurring with a focal term in the word window are collected as the context information. For example, Context$_{Phrasei}$=(term$_1$, terms$_2$, . . . , term$_m$ and Context$_{Phrasei}$= (term$_1$, terms$_2$, . . . , term$_n$). After context information is collected for the first critical phrase in a document, the same process is repeated by identifying remaining critical phrases for the remainder of the document.

In response to collecting the contextual information co-occurring with focal terms from different requirement documents, a probability is calculated for seeing the contextual information co-occurring with the focal terms together in the complete corpus [P(Context Information$_j$|Focal Term$_i$)]. The formula for determining the probability is as follows:

$$P(Context\_Info_j \mid FocalTerm_i) = P(Context\_Info_j \cap FocalTerm_i)/P(FocalTerm_i) \quad (8)$$

Taking into account P(Context_Info/FocalTerm$_i$), low probability instances of the terms co-occurring with the critical terms are deleted, which results in the following two context matrices associated with any two requirement documents (e.g., R$_i$ and R$_j$):

$$CM_{Ri}=((T_m,Part_i)(T_m,Symptom_j),(T_m,Action_k))$$

$$CM_{Rj}=((T_n,Part_l),(T_n,Symptom_m),(T_n,Action_n))$$

Figure 6:
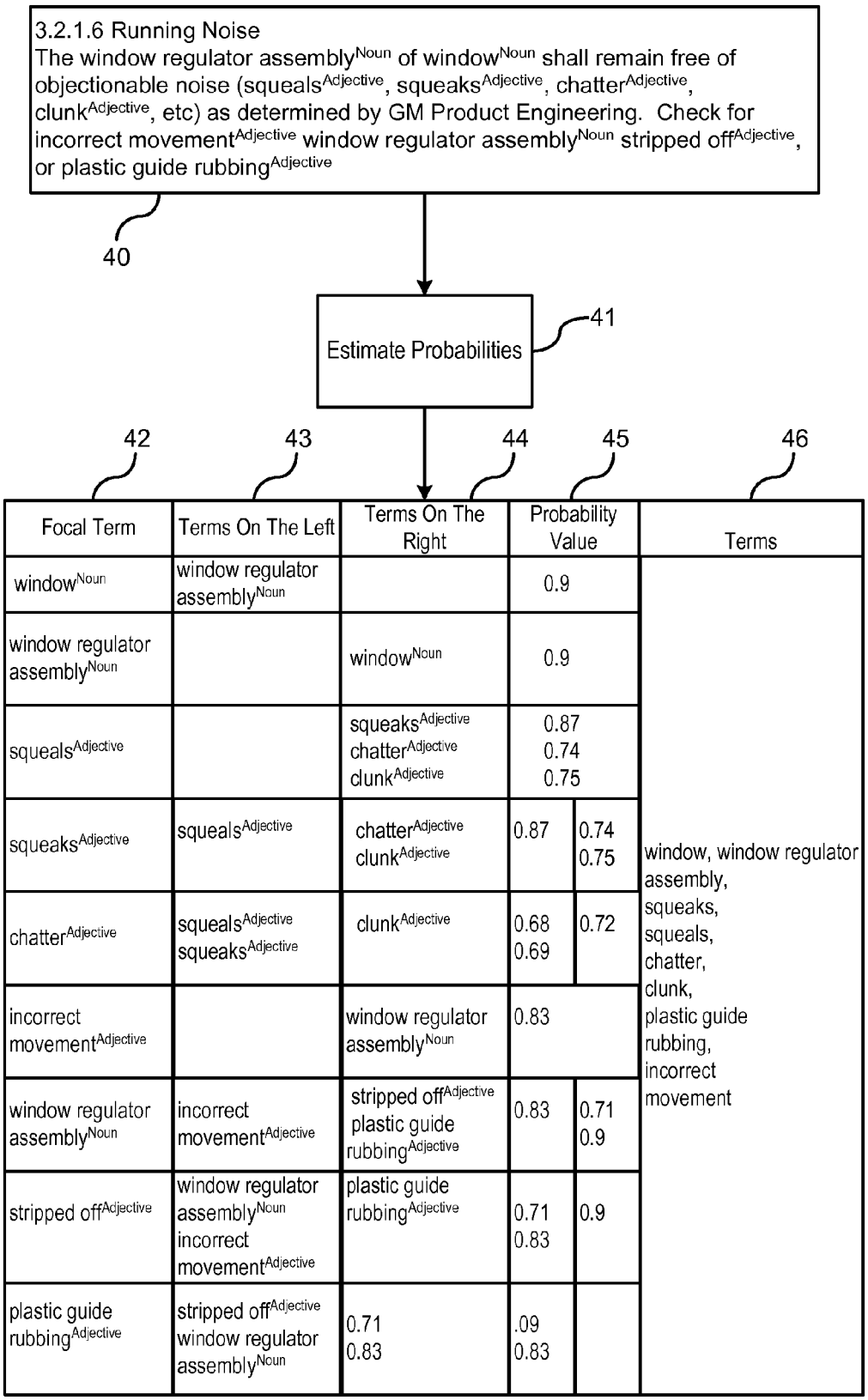
FIG. 6 is a flowchart for associating probabilities with contextual information.

FIG. 6 illustrates a process flow for associating probabilities with contextual information. In block 40, an exemplary requirement is shown with POS tags.

In block 41 probabilities of terms co-occurring with critical terms are identified and set forth in the table identified in table as shown. As shown in the table, a first column 42 represents a focal term. The second column 43 represents identified terms to the left of the focal term. The third column 44 represents identified terms to the right of the focal term. The fourth column 45 represents an identified probability value for each term in relation to the focal terms. The fifth column 46 represents all of the terms identified in the requirement that are being analyzed. Terms having a low probability for co-occurring with critical terms are deleted.

Referring again to FIG. 2, in block 26, a semantic similarity is computed between any two requirement documents (e.g., R$_i$ and R$_j$) by using the context matrices constructed in the previous step. Terms associated with two respective context matrices are used to compute a first term-to-term semantic similarity score such as:

$$sim(Term_i, Term_j)$$

where (Part$_i$,Symptom$_j$,Action$_k$)$_{CMR_i}$ ∈ Term$_i$,
and (Part$_l$,Symptom$_m$,Action$_{nk}$)$_{CMR_j}$ ∈ Term$_i$ The sim(Term$_i$,Term$_j$) is represented by the following equation:

$$sim(Term_i, Term_j) = \log_2\left\{1 + \frac{hits(Term_i, Term_j)^2}{hits(Term_i) \cdot hits(Term_j)}\right\} \quad (9)$$

where, hits(Term$_i$) and hits (Term$_j$) as well as hits (Term$_i$, Term$_j$) represents the number of times (Term$_i$) and (Term$_j$) as well as the binary Tuple(Term$_i$,Term$_j$) appear in the corpus.

This score is subsequently used to compute a tuple-to-tuple semantic similarity score:

$$sim(Tuple_i, Tuple_j)$$

where CMR$_{Ri}$,∈Tuple$_i$, and
  CMR$_{Rj}$,∈Tuple$_j$.

The sim(Tuple$_i$,Tuple$_j$) is represented by the following equation:

$$sim(Tuple_i, Tuple_j) = \log_2\left\{1 + \frac{hits(Tuple_i, Tuple_j)^2}{hits(Tuple_i) \cdot hits(Tuple_j)}\right\} \quad (10)$$

where, hits(Tuple$_i$) and hits(Tuple$_j$) represents the frequency of occurrence of the tuples in the corpus, whereas the hits (Tuple$_i$,Tuple$_j$) represents the number of times (Tuple$_i$) and (Tuple$_j$) appear in the documents of the corpus.

Eq. (10) is achieved by extending a standard PMI-IR definition and making two changes: (1) the square term in the numerator and; (2) addition of one to the fraction. Both changes are motivated to scale the PMI measure between zero (tuples never co-occurring) and one (identical tuples or tuples always occurring together).

By combining term-to-term and tuple-to-tuple semantic similarity scores computed in Eq. (9) and (10) respectively the text-to-text semantic similarity score is derived using the formula as follows:

$$sim(R_i, R_j) = \frac{1}{2}\left(\left(\frac{\sum_{Tuple_i \in R_i}(\max sim(Tuple_i, R_j) \cdot idf(Tuple_i))}{\sum_{Tuple_i \in R_i} idf(Tuple_i)}\right) + \left(\frac{\sum_{Tuple_j \in R_j}(\max sim(Tuple_j, R_i) \cdot idf(Tuple_j))}{\sum_{Tuple_j \in R_j} idf(Tuple_j)}\right)\right) \quad (10)$$

The max sim(Tuple$_i$,R$_j$) is calculated by using the following formula:

$$\max sim(Tuple_i, R_j) = \max_j\{sim(Tuple_i, tuple_j)\}; tuple_j \in R_j \quad (11)$$

Given the calculated semantic similarity, the algorithm classifies the requirement linking into the following three categories: The first category, if the semantic similarity value between R$_i$ and R$_j$ is above 0.87 then R$_i$ and R$_j$ is classified as having high likelihood of linking. The second category, if the semantic similarity value between R$_i$ and R$_j$ is greater than 0.63 but less than 0.87 then R$_i$ and R$_j$ are classified as having medium likelihood of linking. The third category, if the semantic similarity value between R$_i$ and R$_j$ is less than 0.63 then R$_i$ and R$_j$ are classified as having low likelihood of linking. It should be understood that the above ranges are only one grouping of recommended ranges, and ranges in addition to the ranges described herein may be utilized without deviating from the scope of the invention.

Given the likelihood determinations from each respective set of requirements documents, a matrix is generated as illustrated block 27. The matrix matches each requirement against one another and identifies whether a linking relationship exists and the strength of the linking relationship.

In block 28, the output record generator outputs an analysis report which is provided to a domain or subject matter expert to review. The output record generator may output an electronic report or a hardcopy report for use by the subject matter expert. Utilizing the identified linking relationships, the subject matter expert reviews and modifies the requirements accordingly.

It should be understood that analysis report not only identifies linking relationships to improve the textual requirements, but the analysis report assists test engineers by indicating how the new requirements are connected to old requirements. As a result, tester engineers can include specific test cases to a test plan to identify any potential error. This not only improves the test, but the product quality and warranty. In addition, the analysis report may be a precursor to identifying warranty issues since the warranty takes a predetermined amount of time (e.g., 6 months) before data is collected when a new model is produced.

While certain embodiments of the present invention have been described in detail, those familiar with the art to which this invention relates will recognize various alternative designs and embodiments for practicing the invention as defined by the following claims.

What is claimed is:

1. A method of identifying linking relationships of requirements in a plurality of requirement documents comprising the steps of:
   (a) identifying terms in the plurality of requirement documents;
   (b) assigning a part-of-speech tag to each term, the part-of-speech tag indicating whether the term is a part term, symptom term, action term or failure mode term;
   (c) selecting each identified term as a focal term and respectively determining co-occurring terms within a predetermined distance of the selected focal term;
   (d) calculating a linking relationship probability for each co-occurring term associated with the selected focal term;
   (e) repeating steps (a)-(d) for each selected focal term in the plurality of requirement documents;
   (f) comparing the selected focal terms and associated co-occurring terms between the plurality of requirement documents;
   (g) identifying a degree of linking relationship between two requirements as a function of a comparison between selected focal terms and the associated co-occurring terms between the plurality of requirement documents; and
   (h) outputting an analysis report identifying the degree of linking relationships between two respective requirements.

2. The method of claim 1 further comprising the steps of identifying whether the term is a member of a phrase in response to identifying terms in the plurality of the requirement documents; and
grouping the phrases having a same number of terms.

3. The method of claim 2 further comprising the steps of:
identifying the critical phrases within the identified phrases; and
disregarding non-critical phrases.

4. The method of claim 3 wherein the critical phrases are determined by the formula:

$$(C_{n\text{-}gram})_{i,j} = C_{i,j} * idf_{Ci}$$

where $C_{i,j}$ relates to an appearance of ith phrase in a jth requirement document, and $idf_{Ci}$ is a weighting factor.

5. The method of claim 4 wherein the wherein $C_{i,j}$ is represented by the following formula:

$$C_{i,j} = \frac{n_{i,j}}{\sum_k n_{k,j}}$$

where $n_{i,j}$ is the number of occurrences of a given n-gram, $C_i$ is the appearance of ith phrase in a requirement document $C_j$, and the denominator is the sum of number of occurrence of all n-grams in $C_j$.

6. The method of claim 4 wherein $idf_{Ci}$ is represented by the following formula:

$$idf_{Ci} = \frac{\log|V|}{|\{v: C_i \in v\}|}$$

where |V| is a total number of requirement documents in a corpus, and $\{v: C_i \in v\}$ is number of requirement documents with the records of $C_i$.

7. The method of claim 4 wherein the phrase is identified as a critical phrase if the probability determined for the phrase is above a predetermined percentage of the probabilities determined for all phrases identified.

8. The method of claim 7 wherein the predetermined percentage is 85%.

9. The method of claim 1 wherein assigning a part-of-speech tag associated with a term includes labeling a term with one of a noun, verb, adjective, and adverb, and wherein the part-of-speech tag is used to determine whether the term is a part, symptom, action, or failure mode term.

10. The method of claim 1 further comprising a step of calculating a probability of the term being associated with the respective part-of-speech tag in response to the respective term being assigned a part-of-speech tag.

11. The method of claim 10 wherein the probabilities are calculated using a maximum likelihood estimation as follows:

$$P(pos\text{-}tag_m \mid pos\text{-}tag_{m-1}) = \frac{f(pos\text{-}tag_{m-1}, pos\text{-}tag_m)}{f(pos\text{-}tag_{m-1})}$$

$$P(n\text{-}gram_m \mid pos\text{-}tag_m) = \frac{f(n\text{-}gram_m, pos\text{-}tag_m)}{f(pos\text{-}tag_m)}.$$

12. The method of claim 1 wherein the step of selecting each identified term as a focal term and respectively determining co-occurring terms within a predetermined distance of the selected focal term further comprises the step of collecting contextual information, wherein the contextual information enables comparison of terms in a similar context.

13. The method of claim 12 wherein collecting contextual information comprises the steps of:
identifying a term assigned with a part-of-speech tag as a focal term;
identifying a word window that extends from a left of the focal term and to the right of the focal term; and
collecting co-occurring contextual terms within the word window.

14. The method of claim 13 further comprising the steps of:
collecting each of the focal terms and associated co-occurring terms from the plurality of requirement documents;
calculating a probability for each focal term co-occurring with contextual terms from the plurality of requirement documents; and
discarding focal terms determined having a probability below a contextual probability threshold.

15. The method of claim 14 wherein calculating a probability for each focal term co-occurring with contextual terms from the plurality of requirement documents is determined by the following formula:

$$P(\text{Context\_Info}_j | \text{FocalTerm}_i) = P(\text{Context\_Info}_j \cap \text{FocalTerm}_i)/P(\text{FocalTerm}_i).$$

16. The method of claim 1 wherein identifying a degree of linking relationship between two requirements comprises the steps of calculating a semantic similarity score between two respective requirement documents.

17. The method of claim 16 wherein determining a semantic similarity score further comprises the steps of:
determining a first term-to-term semantic similarity score;
computing a tuple-to-tuple semantic similarity score:
computing a text-to-text semantic similarity score by combining the term-to-term semantic similarity score and tuple-to-tuple semantic similarity score.

18. The method of claim 17 wherein the first term-to-term semantic similarity score is represented by the following formula;

$$sim(Term_i, Term_j) = \log_2\left\{1 + \frac{hits(Term_i, Term_j)^2}{hits(Term_i) \cdot hits(Term_j)}\right\}.$$

19. The method of claim 17 wherein tuple-to-tuple semantic similarity score is determined by the following formula:

$$sim(Tuple_i, Tuple_j) = \log_2\left\{1 + \frac{hits(Tuple_i, Tuple_j)^2}{hits(Tuple_i) \cdot hits(Tuple_j)}\right\}.$$

20. The method of claim 17 wherein the text-to-text semantic score is represented by the following formula;

$$sim(R_i, R_j) = \frac{1}{2}\left(\left(\frac{\sum_{Tuple_i \in R_i}(\max sim(Tuple_i, R_j) \cdot idf(Tuple_i))}{\sum_{Tuple_i \in R_i} idf(Tuple_i)}\right) + \left(\frac{\sum_{Tuple_j \in R_j}(\max sim(Tuple_j, R_i) \cdot idf(Tuple_j))}{\sum_{Tuple_j \in R_j} idf(Tuple_j)}\right)\right).$$

21. The method of claim 20 further comprising the step of determining a maximum text-to-text semantic similarity score as determined by the following formula:

$$\max sim(Tuple_i, R_j) = \max_j\{sim(Tuple_i, tuple_j)\}; tuple_j \in R_j.$$

22. The method of claim 16 further comprising the step of classifying the linking relationship between two requirements into a high likelihood classification, a medium likelihood classification, and a low likelihood classification.

23. The method of claim 22 wherein the high classification includes similarity scores above 0.87, wherein the medium classification includes similarity scores between 0.87 and 0.63, and wherein low classification includes similarity scores less than 0.63.

\* \* \* \* \*